Figure 3:
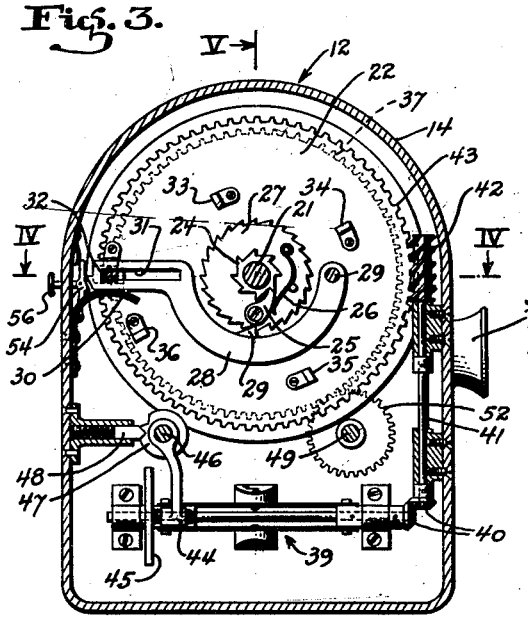

May 17, 1932.  A. V. ZIPSER ET AL  1,858,609
RIP CORD PULLING DEVICE
Filed July 28, 1930   2 Sheets-Sheet 1
Fig. 1.
Fig. 7.
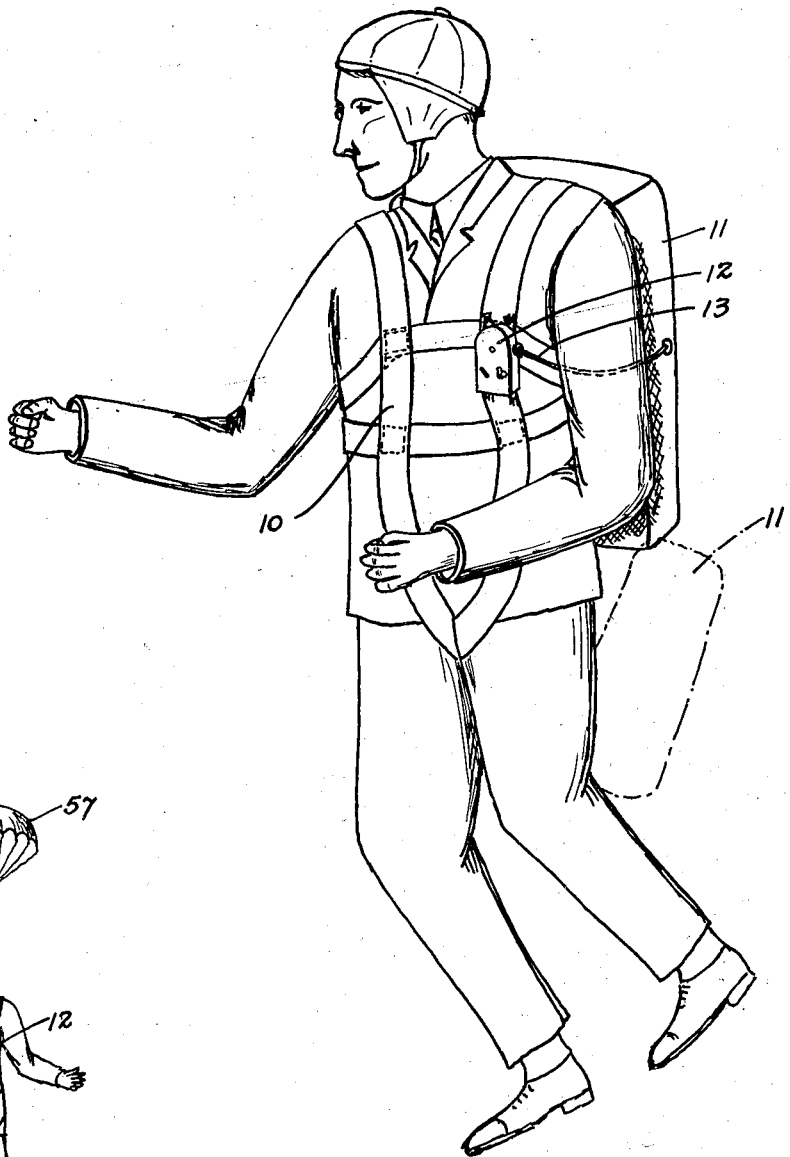
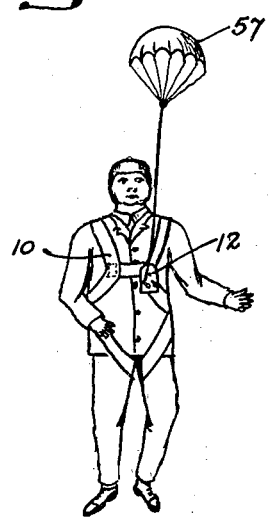
INVENTOR.
Abraham V. Zipser.
Cyril Roche.
BY
ATTORNEY May 17, 1932.  A. V. ZIPSER ET AL  1,858,609
RIP CORD PULLING DEVICE
Filed July 28, 1930  2 Sheets-Sheet 2

INVENTORS.
Abraham V. Zipser,
Cyril Roche.
BY
ATTORNEY

Patented May 17, 1932

1,858,609

UNITED STATES PATENT OFFICE

ABRAHAM V. ZIPSER AND CYRIL ROCHE, OF ALAMEDA, CALIFORNIA

RIP CORD PULLING DEVICE

Application filed July 28, 1930. Serial No. 471,125.

This invention relates to parachutes and more particularly to a device which when set in operation will automatically pull the rip cord of a parachute and open the parachute pack after a predetermined lapse of time.

One of the objects of the invention is to provide a device which when set in operation will automatically open a parachute pack after a predetermined lapse of time.

Another object of the invention is to provide a device of the above character which can be regulated to provide for an opening of a parachute pack after different intervals of lapsed time.

A further object of the invention is to provide means which can be set in operation by an aviator before jumping with a parachute and will automatically thereafter pull the rip cord to open the parachute pack in accordance with a predetermined lapsed time setting.

Another object of the invention is to provide a timing device for controlling the opening of a parachute pack in which a single spring or equivalent means operates to drive the timing mechanism and to also pull the rip cord.

A further object of the invention is to provide in a device of the above character a means whereby its timing characteristics can be changed by a simple operation.

Other objects and advantages will be in part evident and in part pointed out in the following description taken in connection with the accompanying illustrative drawings.

Figure 2:
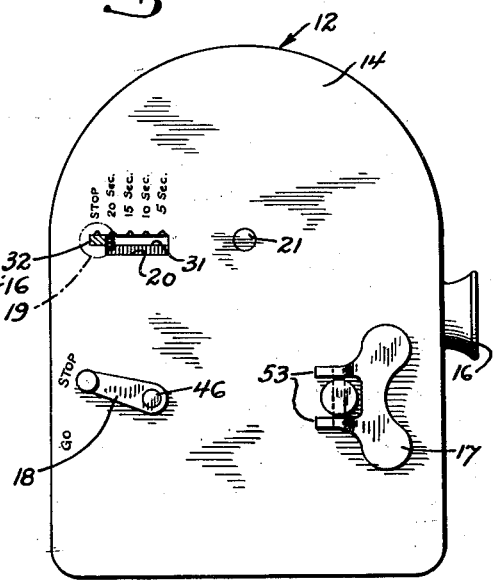
Figure 4:
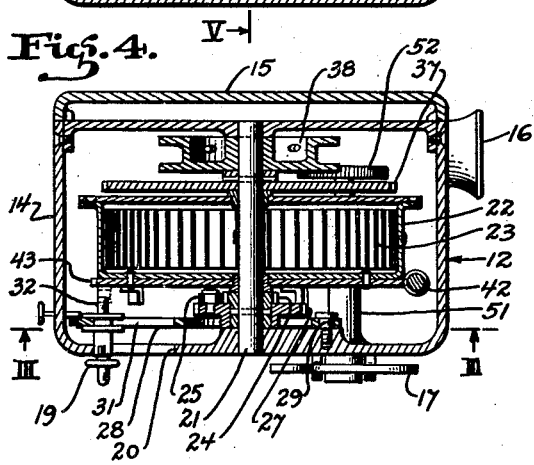
Figure 5:
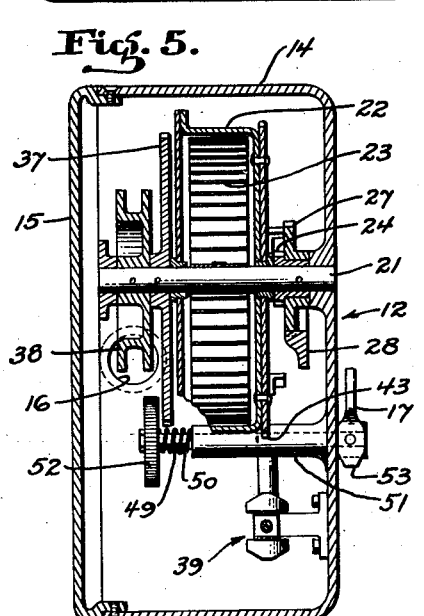
Figure 6:
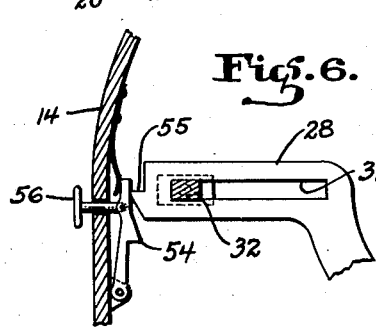

In the drawings wherein like numerals refer to like parts throughout the several views;

Figure 1 is a view showing the improved device attached to the harness of a parachute pack, Figure 2 is a front view of the device, Figure 3 is a vertical sectional view of the device taken along line III—III of Figure 4, Figure 4 is a horizontal sectional view taken along line IV—IV of Figure 3, Figure 5 is a vertical sectional view taken along line V—V of Figure 3, Figure 6 is a view showing a detail of construction, and Figure 7 shows a modified form of the apparatus.

In Figure 1 we show an aviator having the usual parachute harness, designated by the numeral 10, securely fastened upon his person. Associated with the harness 10 we also show a parachute pack 11 which may be disposed upon the back of the wearer, as shown in full lines, or loosely attached to the harness, as a seat pack, as illustrated by the dot and dash lines. In this view we show our improved device, designated by the numeral 12, as secured upon one of the front straps of the harness 10. Extending from the device 12 and under the arm of the wearer to the parachute pack we show a rip cord 13. With the device 12 located in this manner, it will be seen that it can be wound, set, and operated very handily by the wearer and at the same time the rip cord 13 will be exposed so that, if desired, it can be pulled manually. This latter feature is important as it will permit the jumper to pull the cord should the device 12, for any reason, fail to operate.

For a more detailed description of the device 12 reference is now had to Figures 2 to 5 inclusive. In these figures of the drawings, our device is shown as enclosed in a casing 14 which may be made of a thin metal stamping or of cast aluminum. The casing 14 is arranged to be secured upon a back plate 15 so as to totally enclose the internal mechanism. Projecting through the side wall of the casing 14, as shown in Figure 2, we provide a flared opening 16 through which the rip cord 13 is passed. We also provide upon the front wall a wing-nut 17, a starting lever 18 and an adjustable lapsed time controlling stop knob 19. The wing-nut 17 is pivoted so that it can be turned down substantially flush with the casing 14 and in an inoperative position, and the time controlling stop 19 is disposed in a horizontally disposed slot 20 along which indices appear corresponding to a predetermined lapse of time, e. g. the several notches shown are marked 5-sec., 10 sec., 15 sec. and 20 sec. These indices correspond to the time which will elapse after the lever 18 is moved down to its "go" position and before the rip cord 13 will be automatically pulled by the device 12. The stop knob 19 is preferably threaded upon its support so that it can be tightened in any desired position after being set for any particular interval of lapsed time.

Disposed within the casing 14 and rotatably mounted upon a transversely extending shaft 21, we provide a spring drum 22 which carries the outer end of a suitable clock-spring 23. The inner end of the clock-spring 23 is secured to the shaft 21 and is arranged, as will hereinafter appear, so that it will function to drive the timing mechanism and also operate means to pull the rip cord. By this arrangement, we have provided a device in which a single energy storing element operates to perform two distinctly different functions which are correlated to produce a desired result.

The shaft 21 is provided at its front end adjacent the drum with a firmly attached ratchet wheel 24 with which a pawl 25 cooperates. This pawl 25 is biased into engagement with the ratchet wheel 24 by a spring 26 and is mounted upon a second outer ratchet wheel 27 which is journaled upon the hub of the ratchet wheel 24. Engaging the outer ratchet wheel 27 we show a cant-hook or locking lever 28 which in conjunction with the pawl 25 will prevent the shaft 21 from rotating when the spring 23 is wound up. This lever 28 carries a tooth 29 which engages the ratchet wheel 27 and at one end it is pivoted to the casing 14 by a stub shaft 29. At the free end of the lever 28 we show a spring 30 for holding the tooth 29 in engagement with the teeth of the ratchet wheel 27.

Mounted in a slot 31 upon the free end of the lever 28 there is shown a sliding stop 32 which may be secured at several different points by the knob 19. This sliding stop 32, when secured in any one of the several positions provided, cooperates with abutments 33, 34, 35 and 36 carried by the drum 22 and operates to release the shaft 21 after the timing mechanism, to be hereinafter described, permits a predetermined movement of the drum 22.

Upon the rear end of the shaft 21 behind the drum 22 we show a gear 37 and a sheave 38. The gear 37 and the sheave 38 are each firmly keyed upon the shaft 21 and turn with it when the spring 23 is released or is being wound. In connection with the sheave 38 it should be stated that we contemplate attaching the rip cord to it after the device is wound and set.

The timing aspect of our invention contemplates the use of a fly-ball governor 39. This governor 39 is shown as disposed in the casing 14 below the drum 22 and is driven by a suitable drive to be now described. The governor 39 is adapted to be driven, as previously stated, by the spring 23 through a driving connection which consists of a pair of beveled gears 40. One of the beveled gears 40 is secured upon the shaft of the governor 39 and the other is carried by a shaft 41 which is provided at its upper end with a worm 42. The worm 42 is disposed adjacent the drum 22 and meshes with a worm wheel 43 carried by the drum. The pitch of the worm 42 and the worm wheel 43 is such that when the governor is released, as will be presently pointed out, the drum 22 will rotate under the influence of the spring 23 and cause the governor 39 to rotate. The action here is similar to that existing in a standard phonograph drive, except that in this case the spring 23 has no load other than the governor 39. It should be also stated that when the governor is held stationary, as by the application of a brake 44 upon a disk 45 carried by the governor, the worm 42 will serve to retain the drum 22 against rotation. The brake 44 is mounted upon a shaft 46 which extends through the front of the casing 14 and it is upon this shaft 46 that the "stop" and "go" lever 18 is secured. Formed upon the hub of the brake device 44 we show a notched disk 47 and arranged to project into the notches in this disk there is provided a spring pressed rider 48 for retaining the brake in its "stop" and "go" position.

Upon referring to Figure 5 of the drawings it will be seen that the winding or wing-nut 17 is secured upon an axially movable shaft 49 which is biased inwardly by a spring 50. This spring 50 is disposed between a bearing block 51 and a gear 52 carried by the shaft 49. It will also be seen that the hub of the wing-nut 17 is provided with cam projections 53 which engage the front wall of the casing 14 and move the gear 52 into mesh with the gear 37 upon the shaft 21 when the wing-nut is turned up in its spring winding position. By this arrangement the winding means will be completely disengaged from the spring motor at all times when wound and the wing-nut 17 will be held flat against the casing 14 and out of the way when not in use.

A further feature which has not been described, is the provision of a latch 54 as shown in Figures 3 and 6, for retaining the lever 28 down free of the ratchet wheel 27 after it has been tripped. This latch 54 is arranged to engage a projecting lip 55 formed upon the free end of the lever 28 and is provided with an outwardly projecting knob 56 by means of which it can be released when resetting the device.

In a modified form of our invention we may provide, as illustrated in Figure 7, a small parachute 57 for operating the "go" lever 18. By the provision of such a parachute it will be seen that all the wearer need do is to jump and the parachute 57 will automatically set the device 12 in operation. In this connection it should be stated that the parachute 57 will be relatively small and will be attached sufficiently close to the wearer to prevent it from being entangled with the plane structure as so often happens when the rip cord is pulled too soon.

The operation of our device is as follows:

It is assumed that a rip cord has been attached to the sheave 38 and that the spring 23 is wound up and that the governor brake 44 and the lever 28 are cooperating to maintain the spring in this condition. It will also be assumed that the wearer desires to have the rip cord 13 pulled, 10 seconds, after he jumps. Under these conditions the operator will move the time controlling stop 32 along the slot 20 to the point corresponding to, and marked 10 seconds, where he will tighten it in place. With the device thus set the wearer need only push the lever 18 into its "go" position and jump. As soon as the "go" lever is thus operated the governor 39 will be released and the drum 22 will be permitted to rotate at a predetermined speed under the control of the governor. In thus rotating the drum 22 will carry the abutment 34 around and into engagement with the time stop 32. As the drum continues to rotate the tooth 29 will be drawn from the ratchet wheel 27 and release the shaft 21 and thus permit the spring to unwind freely without any resistance except that exerted by the rip cord 13 which will be pulled in upon the sheave 38.

When the shaft 21 is thus released it will be understood that worm 42 will function to hold the drum 22 and consequently the outer end of the spring 23 relatively stationary, as the spring 23 will when thus released unwind in an instant.

In other words, as long as the shaft 21 is held against rotation by the rachet 27 and pawl 29 the spring 23 will operate to drive the timing element but as soon as the pawl 29 is withdrawn from the ratchet 27 the spring will be freed at its inner end and it will, so to speak, "let go" and exhaust itself completely and thus wind the rip cord upon the sheave 38 in one quick operation.

With this arrangement, even though the timing device continues to operate for a short time, the difference in speed between the shaft 21 and the worm gear 43 will be so great when the ratchet 27 is released that the worm gear 43 may be considered as standing still.

As the lever 28 is moved down under the influence of the abutment 34 and the tooth 29 releases the ratchet wheel 27, the latch 54 will engage the lip 55 on the lever 28 and hold the lever 28 and the tooth 29 against reentering the ratchet wheel 27 under the influence of the spring 30 which is now compressed.

After our device has operated as above it will need to be rewound and reset. This can be done at the time the parachute is refolded. To reset the device the operator will move the time stop 32 to the "stop" position shown in Figure 2, and with the lever 18 in the "go" position he will wind the spring 23 sufficiently to rotate the governor 39 and bring an outer abutment 57 into the position against the stop 32, as shown in Figure 3. As soon as the drum is returned to this position the lever 18 will be moved to the "stop" position and the device will be ready for the final winding up of the spring 23.

While we have, for the sake of clearness and in order to disclose our invention so that the same can be readily understood, described and illustrated specific devices and arrangements, we desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described our invention, what we claim and desire to secure by Letters Patent is—

1. In a parachute rip cord pulling device the combination of, a rip cord, an energy storing means adapted when released to pull the rip cord, a timing means driven by said energy storing means, and a stop for said energy storing means adapted to be rendered inoperative by said timing means after a predetermined interval of lapsed time to permit said energy storing means to pull said rip cord.

2. In a parachute rip cord pulling device the combination of, a rip cord, an energy storing means adapted when released to pull the rip cord, a timing means driven by said energy storing means, a latch for holding said energy storing means inactive adapted to be released by said timing means after a predetermined interval of lapsed time to permit said energy storing means to pull said rip cord, and means for controlling the operation of said timing means.

3. In combination with a parachute pack having the usual rip cord for releasing the parachute, a retractile device carried by the parachute harness to which the rip cord is attached, means for holding said retractile device against a rip cord pulling movement, and a timing element also driven by said retractile device adapted when set in operation to release said holding means after a predetermined lapse of time and permit said device to pull the rip cord.

4. In combination with a parachute pack having the usual rip cord for releasing the parachute, a spring under tension carried by the parachute harness to which the rip cord is attached, means for holding said spring under tension and against movement, and a timing element connected to and driven by said spring adapted when set in operation to release said holding means after a predetermined lapse of time and permit said spring to pull the rip cord.

5. In an automatic rip cord pulling device the combination of, a casing adapted to be attached to a parachute harness, an energy storing spring in said casing, a sheave adapted to be driven by said spring, a rip cord attached at one end to said sheave and extending to the parachute pack, a timing element also driven by said spring, means for normally preventing the operation of said sheave, and means controlled by said timing element for setting said sheave in opertion to pull the rip cord after the timing element has operated a predetermined number of seconds.

6. In an automatic rip cord pulling device the combination of, a casing adapted to be attached to a parachute harness, an energy storing spring in said casing, a means adapted to be driven by said spring, a rip cord attached at one end to said means and extending to the parachute pack, a timing element driven by said spring, and means controlled by said timing element for setting said spring in operation to drive said first means and pull the rip cord after the timing element has operated a predetermined number of seconds.

7. In a device of the character described the combination of, a shaft, a spring drum rotatably mounted upon said shaft, a clockspring attached at one end to said shaft and at the other end to said drum, a ratchet device for preventing said shaft from turning under the influence of said spring, a timing element connected with said drum adapted when not operating to hold the drum against rotation about said shaft, means for setting said timing element in operation to permit a turning of said drum, and means carried by said drum adapted to release said ratchet device after the timing device has operated for a predetermined number of seconds.

8. In a device of the character described the combination of, a shaft, a spring drum rotatably mounted upon said shaft, a clockspring attached at one end to said shaft and at the other end to said drum, a ratchet device for preventing said shaft from turning under the influence of said spring, a timing element connected with said drum adapted when not operating to hold the drum against rotation about said shaft, means for setting said timing element in operation to permit a turning of said drum, a plurality of abutments carried by said drum adapted to release said ratchet device after the timing device has operated for different predetermined periods of time, and an adjustable timing stop adapted to cooperate with said abutments to determine the period of operation of said timing device.

9. An automatic parachute rip cord pulling device having a timing element characterized by the fact that a rip cord pulling mechanism and a timing element for delaying the operation of the rip cord pulling mechanism are each driven from the same source of energy.

10. In a device of the character described the combination of, a rip cord pulling element, a timing device for controlling the operation of said pulling element, and a single energy storing spring for driving both said rip cord pulling element and said timing device.

ABRAHAM V. ZIPSER.
CYRIL ROCHE.